Aug. 19, 1930.                C. T. DRAPER                1,773,525
                    MEANS FOR DRYING CYLINDRICAL ARTICLES
                  Original Filed July 28, 1924    9 Sheets-Sheet 1

INVENTOR:
CHARLES T. DRAPER
BY
                ATTORNEY

Aug. 19, 1930.  C. T. DRAPER  1,773,525
MEANS FOR DRYING CYLINDRICAL ARTICLES
Original Filed July 28, 1924    9 Sheets-Sheet 5

INVENTOR:
CHARLES T. DRAPER
BY
ATTORNEY

INVENTOR:
CHARLES T. DRAPER
BY
ATTORNEY

Aug. 19, 1930.   C. T. DRAPER   1,773,525
MEANS FOR DRYING CYLINDRICAL ARTICLES
Original Filed July 28, 1924   9 Sheets-Sheet 8

INVENTOR:
CHARLES T. DRAPER
BY

ATTORNEY

Aug. 19, 1930.   C. T. DRAPER   1,773,525
MEANS FOR DRYING CYLINDRICAL ARTICLES
Original Filed July 28, 1924   9 Sheets-Sheet 9

INVENTOR
CHARLES T. DRAPER
BY

ATTORNEY

Patented Aug. 19, 1930

1,773,525

UNITED STATES PATENT OFFICE

CHARLES T. DRAPER, OF CLEVELAND, OHIO, ASSIGNOR TO THE DRAPER MANUFACTURING COMPANY, OF CLEVELAND, OHIO, A CORPORATION OF OHIO

MEANS FOR DRYING CYLINDRICAL ARTICLES

Original application filed July 28, 1924, Serial No. 728,535. Patent No. 1,705,084, dated March 12, 1929. Divided and this application filed March 31, 1926. Serial No. 98,764.

My invention relates to improvements in method of and means for drying cylindrical articles, and more especially sheet metal containers that are coated or painted exteriorly or interiorly. The object of my invention is to dry quickly and evenly such coated articles at minimum expense without impairing the appearance of the article, while aiding in maintaining the evenness of the coating during the drying process.

I shall describe my improvement as applied to the surface painting of sheet metal barrels, although my invention is much more comprehensive in its scope, as indicated by the appended claims. Briefly describing then, its instant application in a preliminary way, I may say that the sheet metal barrels are initially heated and submitted to the painting operation as to both ends and sides, either manually or mechanically applied, after which they are placed upon an extended runway whereon they are supported solely by their chime rings. This runway is provided with means for slowly advancing the barrels from one end to the other, rolling them along their end supports in a heated atmosphere which preferably is in circulation and is adapted quickly to dry the paint. Means are provided upon said runway which are adapted to maintain the spacing of the barrels and prevent their contact with each other and with any portion of the mechanism that otherwise might mar the appearance of the completed container. The initial portion of the runway comprises a dry-heater or oven while the terminal portion preferably is open to the circulation of air, whereby the painted or enamelled surfaces of the barrels are sufficiently cooled to permit of handling without affecting their appearance. Preferably, elevating and loading mechanisms are associated with the apparatus of my invention in order to facilitate and cheapen the handling and are here adverted to, although these form no part of my present invention and will not be described in detail.

The features, advantages and preferred mode of operation of my improved mechanism may now be explained in connection with the accompanying sheets of drawings, wherein—

Fig. 3 is a slightly enlarged view of the heating appliance; all of the figures on Sheet 1, however, being upon an extremely reduced scale.

Fig. 4 is a side elevation of the skidway on line 4—4, Fig. 1, on which the loading takes place.

Fig. 5, is a section view of the elevating mechanism associated with the skidway, on line 5—5, Fig. 1.

Fig. 5—A is a fragmentary view thereof upon an enlarged scale.

Fig. 6 is a transverse sectional view of the furnace on line 6—6, Fig. 1, while the remaining figures of the drawings are upon materially larger scales to represent the details of the apparatus diagrammatically shown on Sheet 1.

Throughout the several figures of the drawings I have employed the same character of reference to indicate similar parts.

Figures 1, 2:
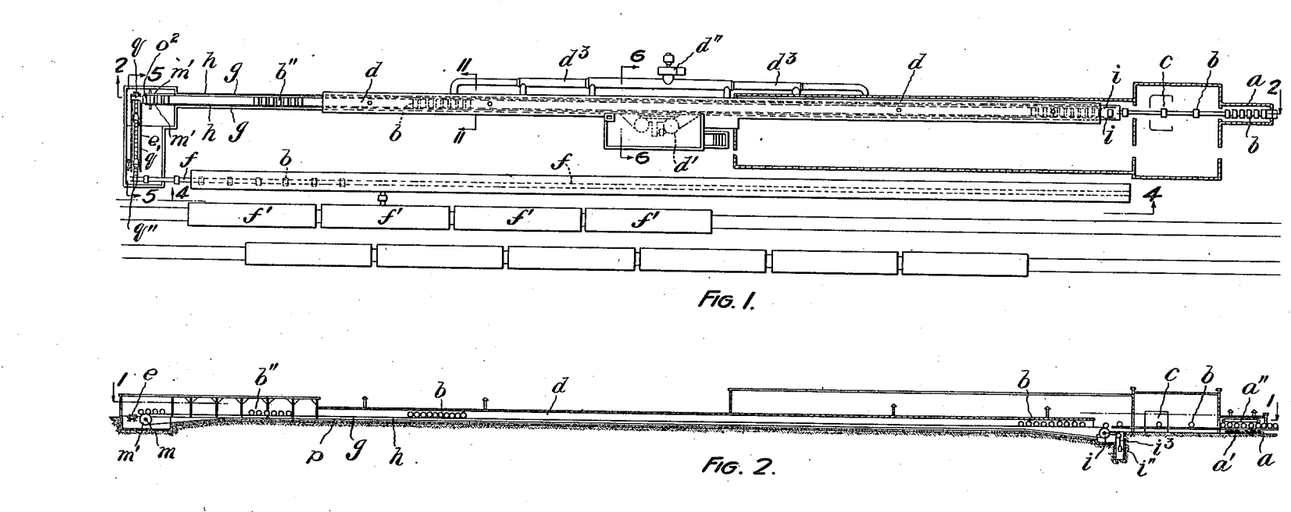
Figure 1 is a diagrammatic plan view of the system of my invention and its associated loading mechanism.
Fig. 2 is a longitudinal sectional view thereof, on line 2—2, Fig. 1.

Referring first to Sheet 1, it should be understood that the sheet metal barrels are supplied to the system or apparatus shown at the right, advanced longitudinally toward the left, after being suitably painted or coated and transferred from the left hand or loading end of the apparatus to freight cars or other carriers. The diagrammatic plan view of Fig. 1, is intended to show a heater $a$ upon the extreme right to which the barrels $b$ or other sheet metal containers are introduced, after which they are suitably painted, coated or enameled at $c$, either exteriorly, including their ends, or interiorly, or an acid-resisting lining, such as paraffin may be applied to such containers. All this is accomplished in accordance with well-known practice and does not require explanation in detail.

The barrels $b$ upon being suitably treated are supported terminally by their chime rings upon parallel rails extending through a heated passageway $d$, associated with a furnace $d'$ and exhausting mechanism $d''$ for effecting a circulation of heated air throughout the said passageway in order to effect rapid drying of the barrels.

The barrels preferably are supplied to a suitable conveyor, later explained in detail, which rolls them slowly through the passageway in a heated atmosphere which will effectually dry them, after which they are exposed to atmospheric air, as at $b''$, in order to cool the heated surfaces, or chill the paraffin, if this material is used, prior to advancing the barrels by rolling them upon the elevating mechanism $e$ which delivers said barrels to a skidway $f$ from which they may be loaded into the waiting freight cars $f'$.

Figures 3, 4, 5, 5A, 6:
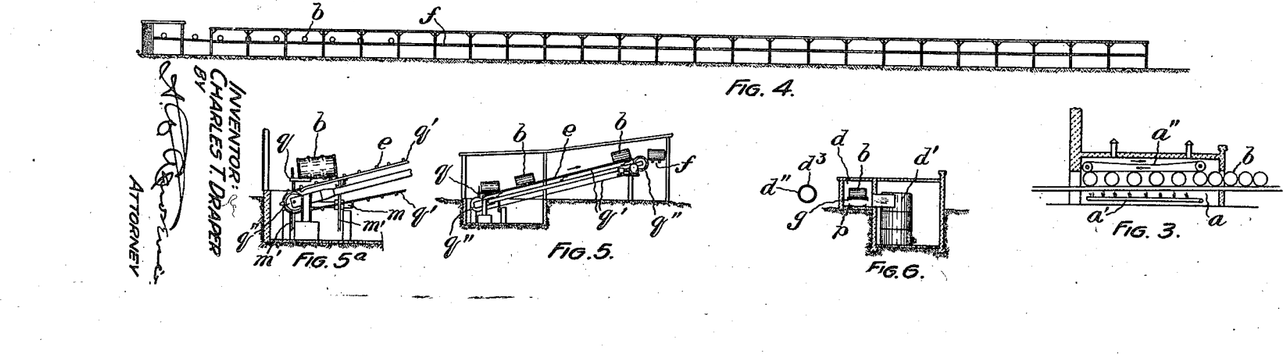

The heater $a$ is diagrammatically indicated in Fig. 3, equipped with gas burners $a'$ and a travelling belt $a''$ for passing the barrels $b$ from one end thereof to the other. The elevating mechanism $e$ shown in fragmentary and reduced scale sections in Figs. 4 and 5, and the drying furnace $d'$ with the conduit $d^3$ of the exhausting system appear in Fig. 6 as diagrammatically related for cooperation, but require no specific explanation as these features are merely adjuncts of the invention or improvements herein explained.

The conveyor mechanism comprises essentially two parallel supporting rails $g$ $g$ extending substantially the length of the system with which are associated conveyor chains $h$ formed of link-bars $h'$ terminally supported by grooved rollers $h''$ upon said rails. Sprocket wheels $i$ accommodate the endless chains and turn them from the lower to the upper or conveying level, as will be best understood by referring to Fig. 7.

The grooved supporting rollers $h''$ readily slide laterally upon their shafts $h^3$ which extend transversely from chain to chain and intermediately of said rollers spacing members $h^4$ preferably are secured upon the link-bars in opposing paired arrangement.

Figure 7:
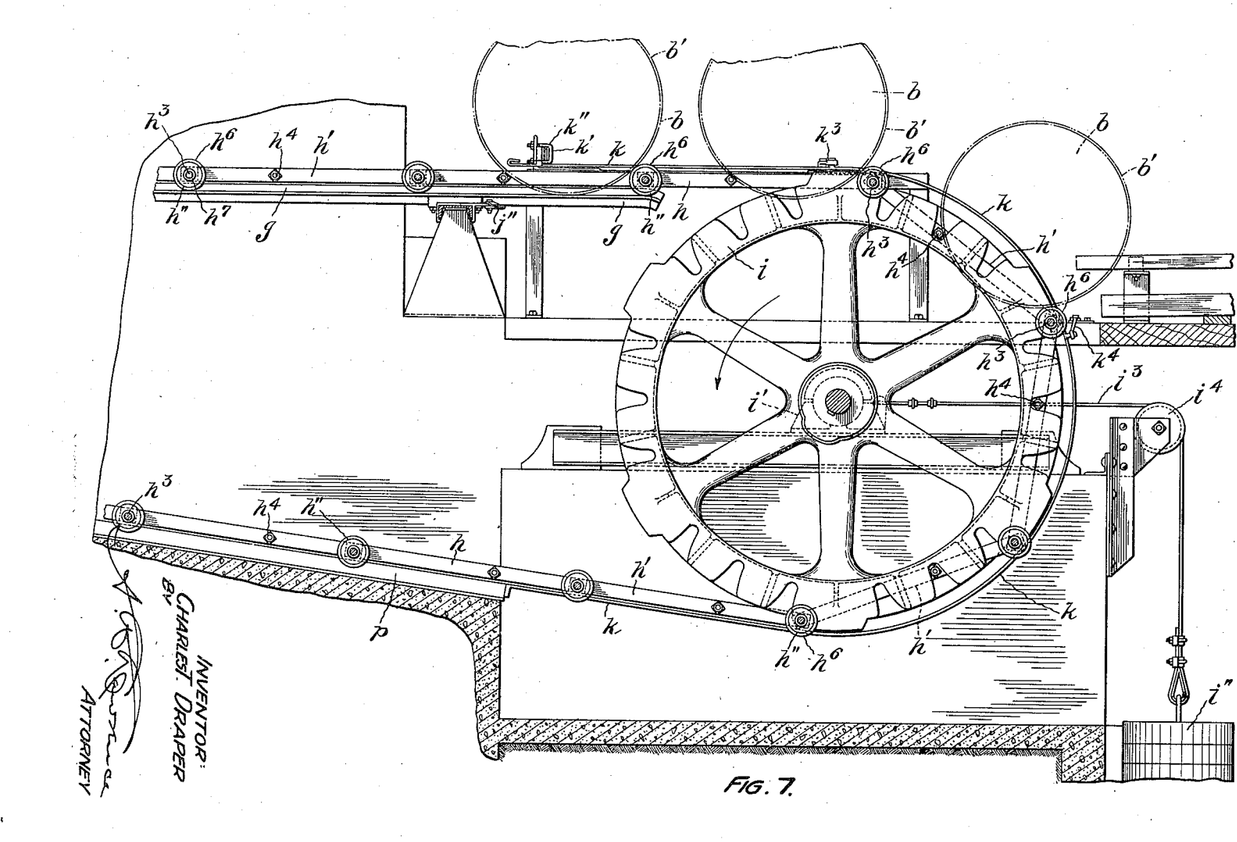
Fig. 7 is an enlarged vertical section on line 7—7, Fig. 8, showing the loading end of the conveyor mechanism.
Figure 8:
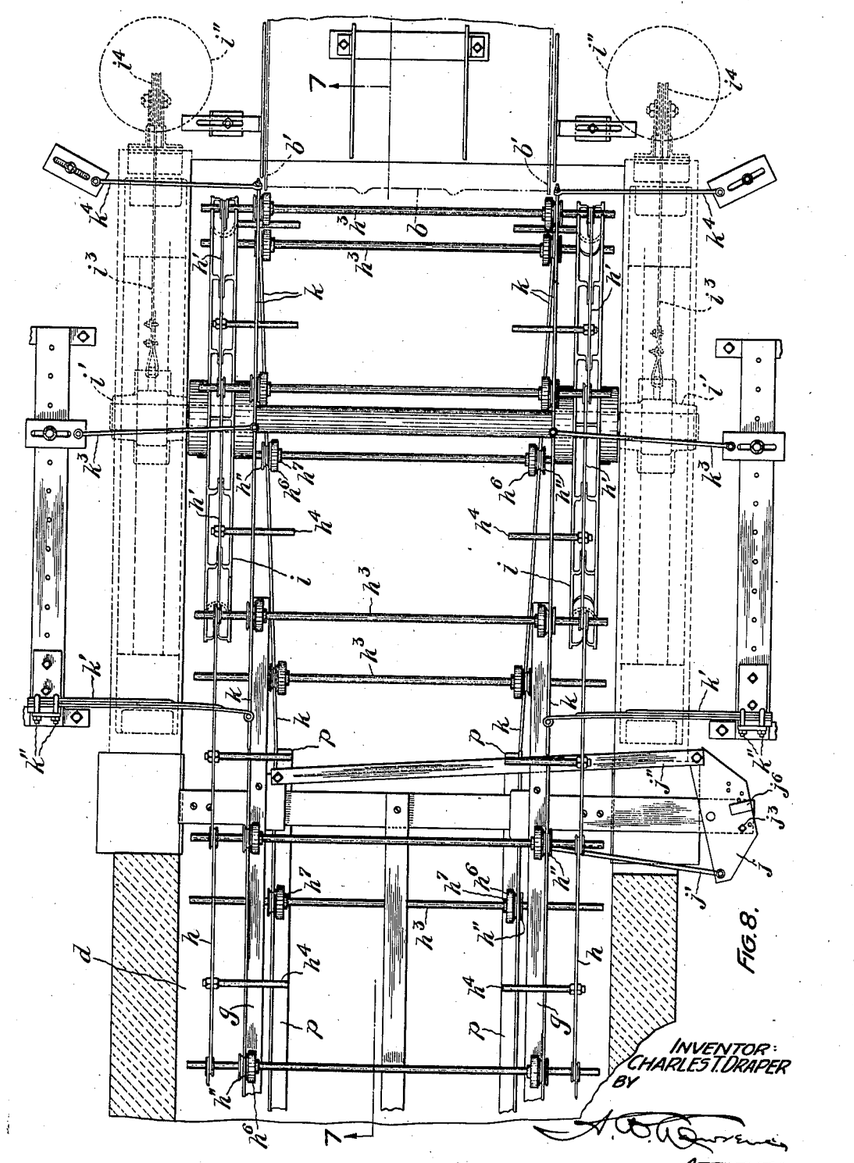
Fig. 8 is a plan view of said loading end of the conveyor.
Figure 18:
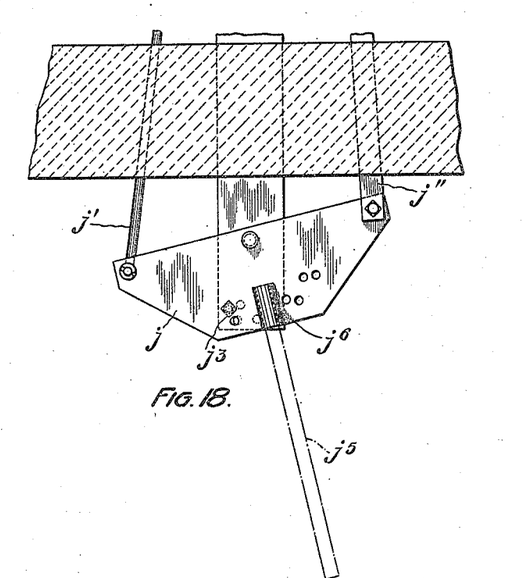
Fig. 18 is a fragmentary plan view of the adjusting retaining mechanism for altering the gauge of the supporting rails.

It will be understood that a system of the character herein shown must be adapted for use with various sizes of containers and since these are to be terminally supported, preferably by their chime rings upon the supporting rails, it is necessary to make the rails relatively adjustable toward and from each other for the purpose of accommodating barrels and containers of various sizes. The means for adjusting the rails are applied at intervals throughout the length of the conveying mechanism, of which they form a part, and comprise a pivoted blade $j$ having links $j'$ $j''$ respectively connected terminally with the two supporting rails so that upon moving said blade about its pivot, the rails will be separated or approximated with respect to each other until suitably adjusted for the particular size of container which is to be handled. A bolt, as $j^5$, may be inserted in any of the registering openings, as best shown in Fig. 18, for the purpose of locking the rails in their adjusted position. Desirably, a lever $j^5$ may be inserted within the socket $j^6$ provided upon the blade $j$ more easily to actuate the supporting rails into their different positions of adjustment when the bolt is removed. The grooved rollers $h''$ automatically conform to the gauge of the supporting rails as they readily slide along their shafts in conformance with the adjustment of said rails, and in order to bring them into alinement when travelling from their lower to their upper positions, flexible rods $k$, Figs. 7 and 8, are adapted exteriorly to engage the grooved rollers during their transit from the lower to the upper positions of the conveyor chains. The upper ends of said rods are tensioned by the leaf-springs $k'$, said springs being adjustably held at their outer ends by shackle-bolts $k''$, while adjustably supported links $k^3$ and $k^4$ intermediately position these flexible rods $k$.

Because of the fact that the conveyor chains are subjected to considerable variations in temperature, it will be understood that their expansion and contraction must be compensated and this feature is provided for by slidably mounting the bearings $i'$ of the sprocket wheels so that the chains will be tensioned by means of the heavy weights $i''$ supported by cables $i^3$ extending over the pulley wheels $i^4$ to said bearing blocks as best shown in Fig. 7.

Figures 12, 13:
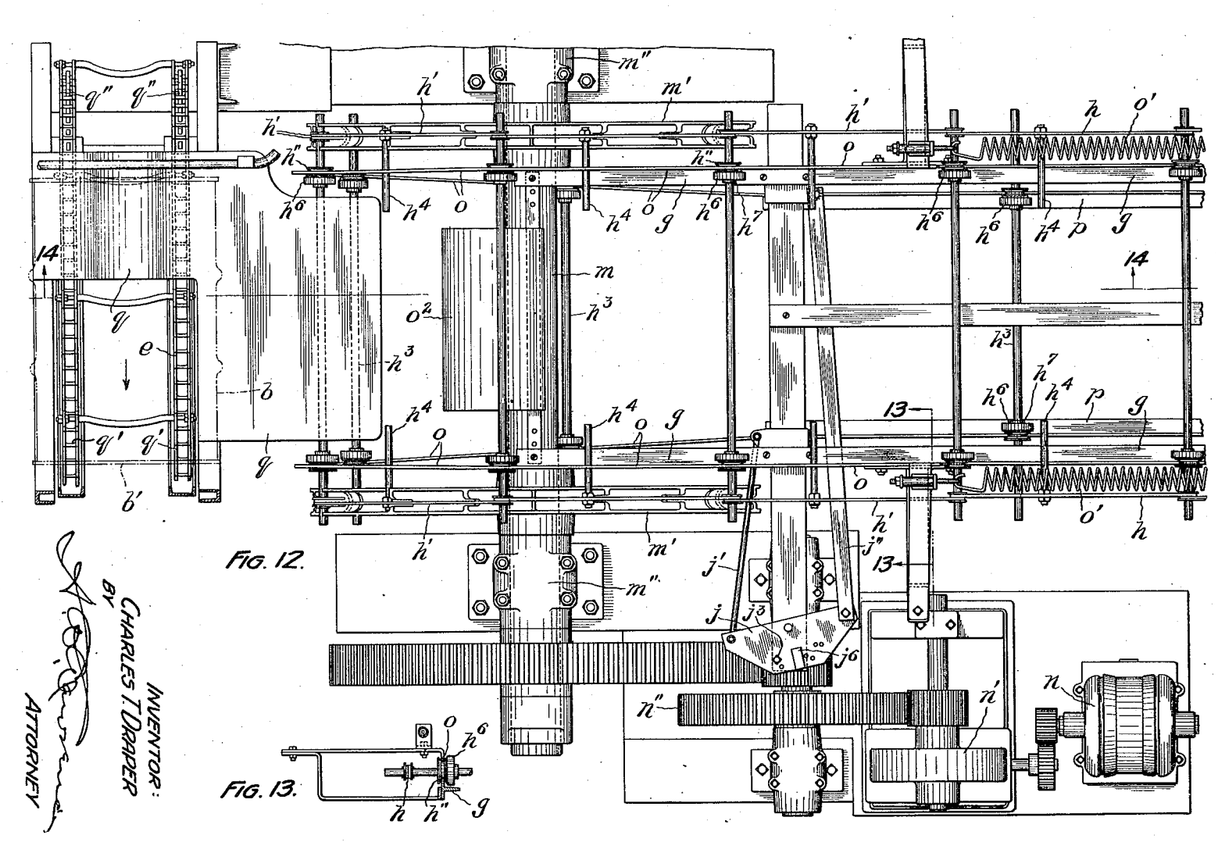
Fig 12 is a plan view of the discharging and elevating mechanism; the latter being broken away.
Fig. 13 is a fragmentary section on line 13—13, Fig. 12, illustrating a detail of the guide rod anchorage.
Figures 14, 15:
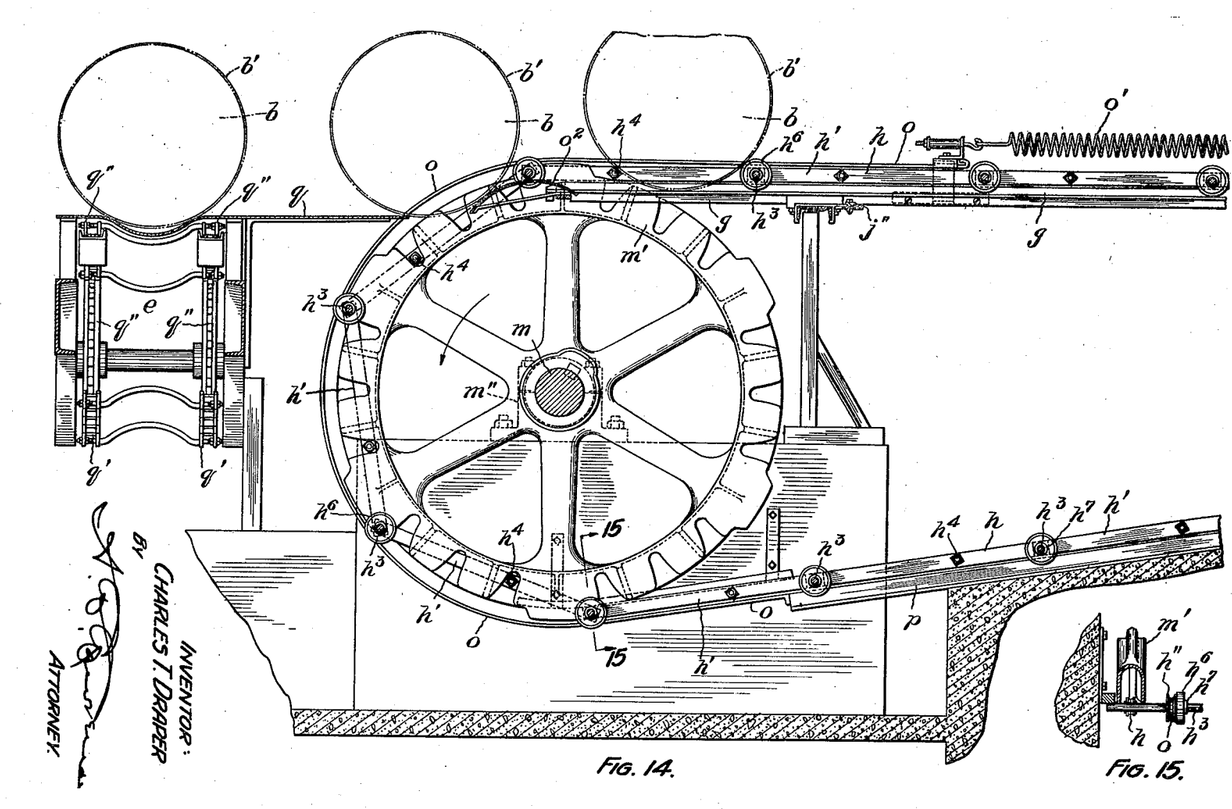
Fig. 14 is a vertical section through the discharge end of the conveyor on line 14—14, Fig. 12.
Fig. 15 is a fragmentary section on line 15—15, Fig. 14.

The outer or delivery end of the system embodies features generally similar to those just explained above; the details of adjusting the gauge of the rail-supports, the sprocket wheels and upper and lower positions of the chains being the same, although the shaft $m$ for said sprocket wheel $m'$ is rigidly journaled at $m''$, Figs. 12 and 14, to afford suitable driving connections. This is provided in the electric motor $n$ and associated worm-drive $n'$ and gearing $n''$ of obvious mechanical construction. The motor $n$ is of low power for the reason that the barrels merely are rolled by the chain drive along the runway while the impelling chains are supported by rollers in their upper and lower levels so that little power is required. The flexible rods $o$ which terminally are in alinement respectively with the upper and lower levels of the rail-supports for the chains, are tensioned by means of coiled springs $o'$ and since the lower rails $p$ are of fixed gauge, these rods serve to bring the rollers leaving the upper rail-supports $g$, $g$, into alinement with the lower rails $p$, $p$, as the chains leave the bottoms of the sprocket wheels turning in a counter clockwise direction, as indicated in Figs. 12, 13 and 15.

A curved member $o^2$ is provided intermediately of the rail-supports $g$, $g$, from which the barrels $b$ are transferred to the platform $q$ of the elevating mechanism. This comprises connected chains $q'$ travelling over driven sprocket wheels $q''$ up an incline to the loading skidway, all of which form no part of my present invention and require no detailed description.

Figure 9:
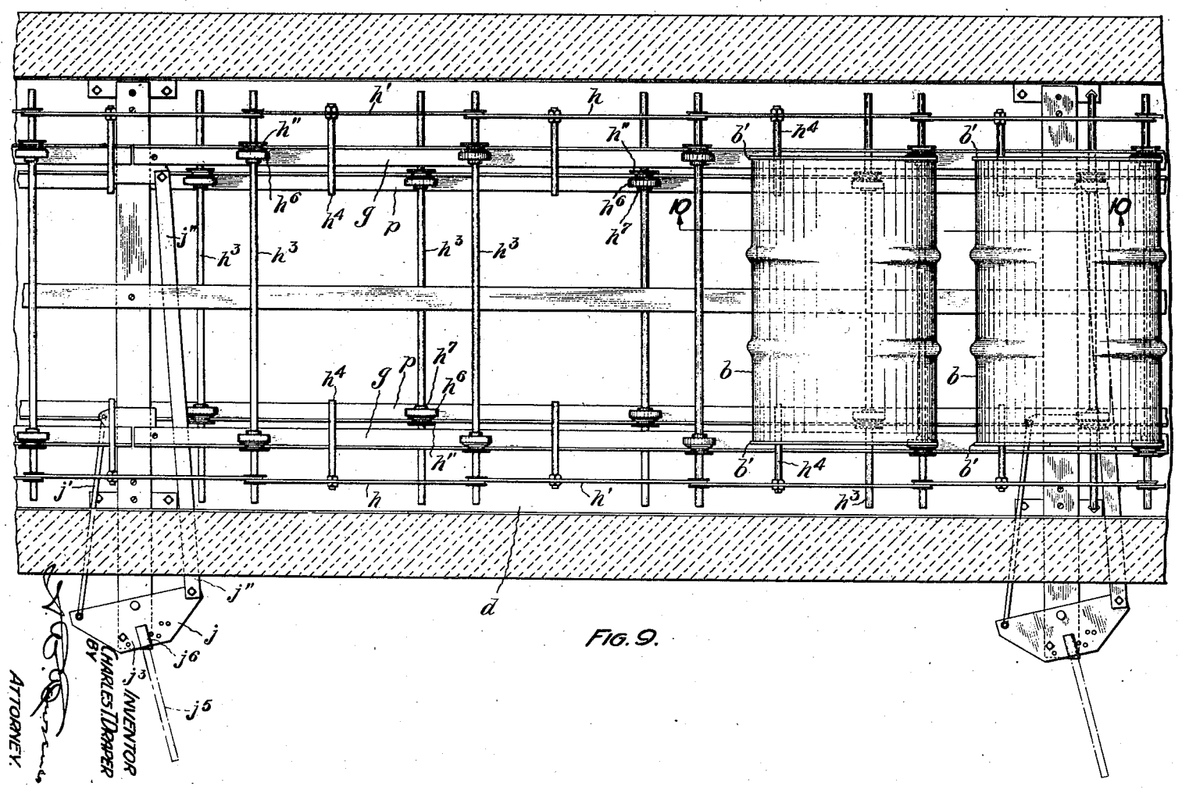
Fig. 9 is a plan view of an intermediate portion of the heating chamber and conveyor on line 9—9, Fig. 10.
Figure 10:
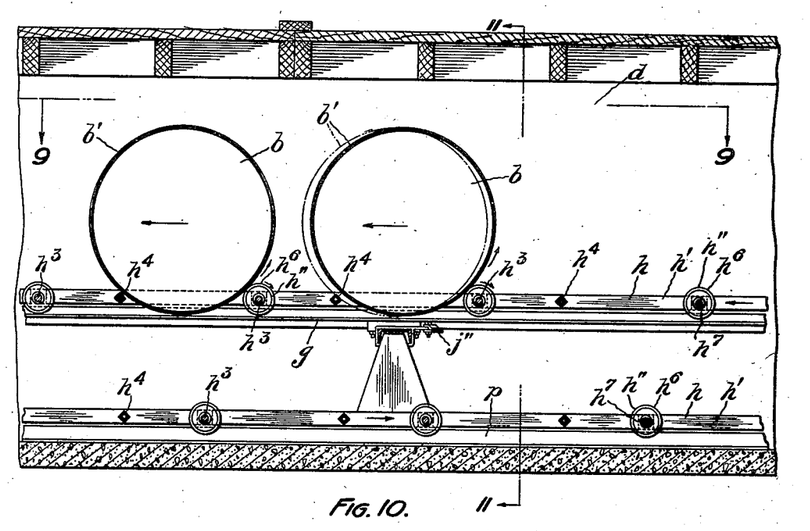
Fig. 10 is a vertical section thereof, on line 10—10, Figs. 9 and 11.
Figure 11:
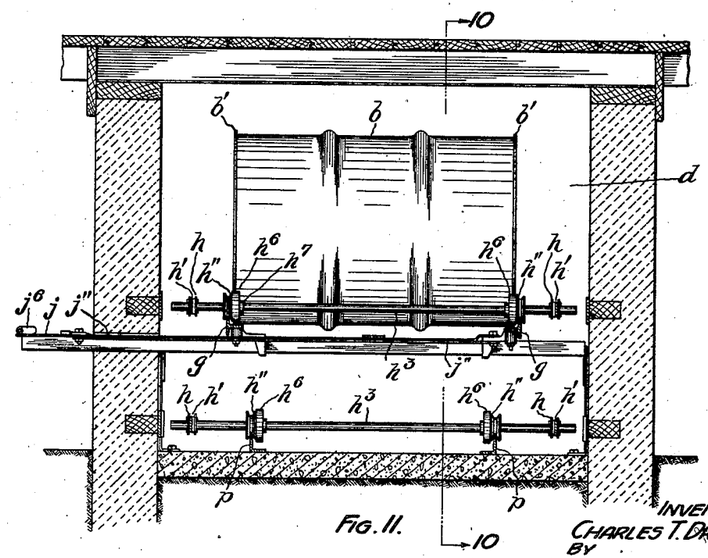
Fig. 11 is a transverse section on line 11—11, Figs. 1 and 10.
Figure 17:
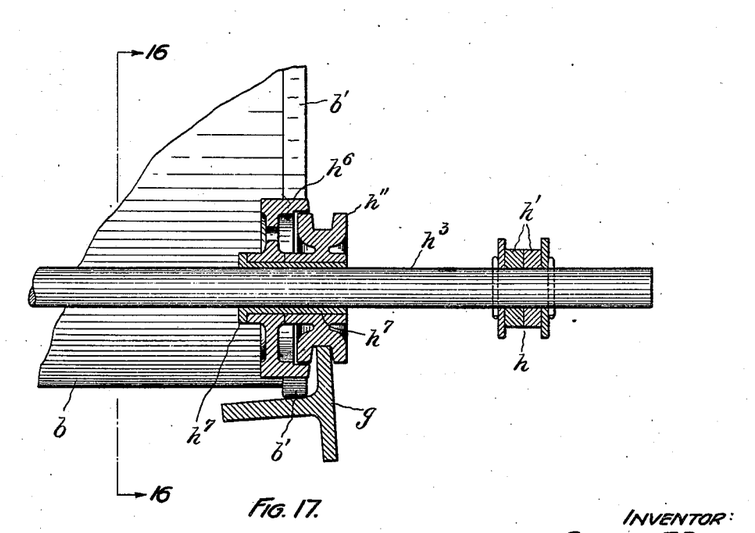
Fig. 17 is a fragmentary section thereof on line 17—17, Fig. 16.
Figure 19:
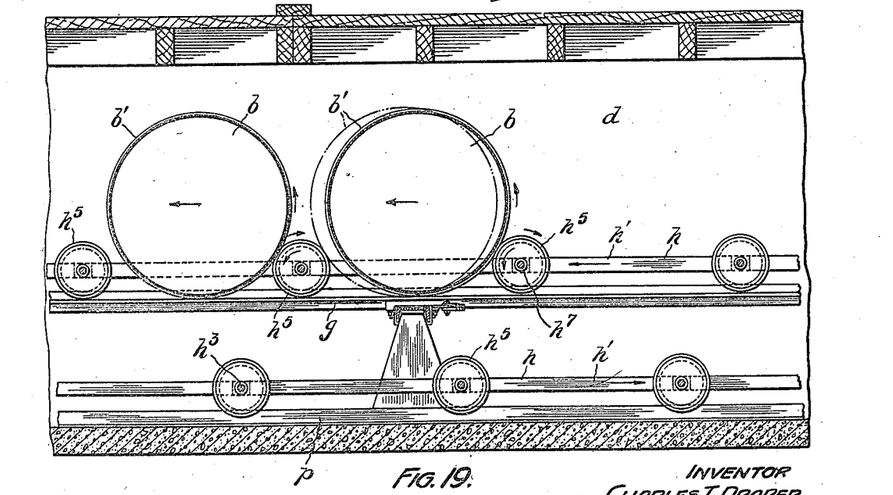
Fig. 19 is a vertical sectional view similar to Fig. 10, showing a modification of the rolls to accomplish both the spacing and advancing of the barrels.

The rail-supports $g$, $g$, desirably may be formed of T-sections as shown in Figs. 11 and 17, while the lower rail-supports may be formed of angle irons; the vertical webs of both sections engaging the grooved rollers $h''$ which support the laterally positioned chains upon the shafts $h^3$ while the spacing members $h^4$ serve to maintain the barrels $b$ out of contact with each other as indicated in Figs. 9 and 10. However, said spacing members may be substituted by employing larger wheels, as $h^5$, Fig. 19, whose diameter is sufficient to prevent the surface contact of the barrels as is well indicated by the dotted line position of the right hand barrel.

Figure 16:
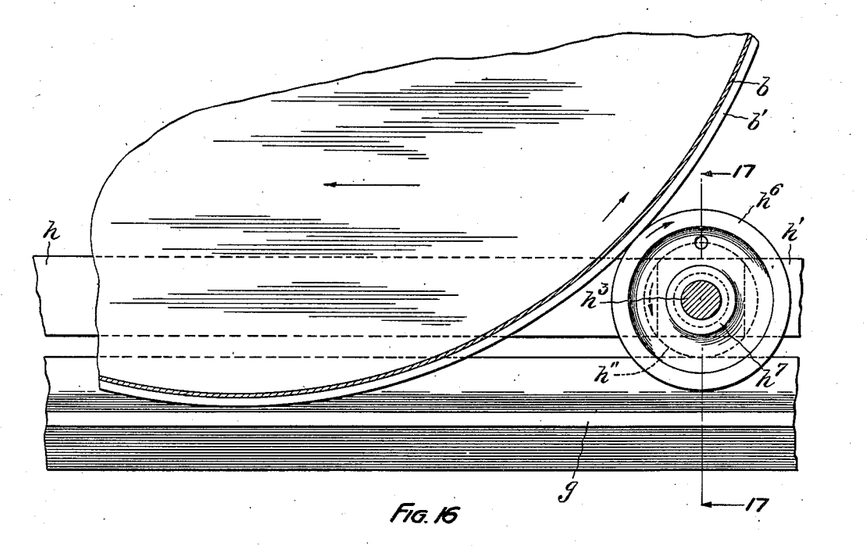
Fig. 16 is a fragmentary view upon an enlarged scale illustrating the action of the composite roller in association with the barrel.

Preferably, these supporting wheels for the chains are composite members comprising two separately journaled rollers as best shown in Fig. 17. One of these $h''$, as already pointed out, is grooved to accommodate the edge of the rail-support $g$, while the other roller, $h^6$, encloses the inner flange thereof and is adapted to bear against the chime ring $b'$ of the barrel; being frictionally rotated in a reverse direction to the turning of the roller $h''$ in order to impel the barrel along the runway with a minimum expenditure of force. The simple and effective action of these composite rollers will be understood at a glance by referring to Fig. 16. A sleeve $h^7$ mounts the composite rollers $h''$, $h^6$, for independent rotation with respect to each other. Referring particularly to Figs. 11 and 17, it will be seen that the rail $g$ supports the chime of the barrel upon its horizontal flange, while its vertical flange affords means for positively preventing appreciable lateral movement of the barrels and keeping them in alinement upon the runway. Moreover, the advancing means for the barrels, as well as the spacing members, are positioned above the supporting surfaces of the rails so as to contact only with the chimes and avoid marking the coated surfaces of the barrels.

It will be appreciated that the painted, enameled or paraffin coated barrels, as the case may be, preferably are continuously advanced along the runway and through the heated atmosphere of its enclosed portion by rolling them axially to retain or insure a smooth, even distribution of the protective coatings for the barrels. Suitable protective coatings are readily dried in the heated atmosphere, or paraffin, for example, may be evenly distributed throughout the interiors of the containers, and upon reaching the open section at the left of the runway, Fig. 1, the coatings will be cooled by the atmospheric air so that the completed barrel may be handled upon the elevating and loading mechanism as previously explained. A paraffin or similar waxlike coating, it will be understood, is solidified rather than dried, but I have employed the latter as a generic term descriptive of treating variously coated containers.

The length of the runway, obviously is somewhat dependent upon the particular nature of the protective coating and heating is resorted to, principally for the purpose of hastening the drying operation and insuring a better commercial product. It will be observed that merely the chime rings $b'$ of the barrels, Fig. 17, come into engagement with the rails, spacing members or advancing rolls, while the protective coating is still in fluid condition, hence the finish of the barrels is not impaired or marred.

In this connection it may be explained that the chime rings of the modern steel barrel have a burnished surface and do not necessarily require the protective coating normally applied to the sides and ends of the steel barrel.

While my system has been explained and shown in some detail, I desire to have it understood that my invention is not confined to the particular mode of operation or prac-

Having now described apparatus adapted for the practice of the method of my invention and certain novel structural features of the particular system shown, I claim as new and desire to secure by Letters Patent, the following:

1. In apparatus of the class described, the combination with supporting rails of means for effecting their relative adjustment toward and from each other and for locking them in adjusted positions, mechanism associated therewith and adapted to impel terminally supported cylindrical articles along said rails, and means for adjusting said mechanism concurrently to conform with the adjusted positions of the supporting rails.

2. In apparatus of the class described, the combination with parallel rail-supports, of advancing mechanism for rolling articles along said supports, including a plurality of connected wheels engaging said rail-supports, and fixed spacing members interposed between the sets of wheels and mounted to travel therewith, substantially as set forth.

3. In apparatus of the class described, the combination with parallel rail-supports, of means for effecting their relative adjustment and positioning toward and from each other, an endless conveyor-chain mounted for travel above and below said rail-supports, a plurality of bearing wheels carrying said chain upon the rail-support, associated idler wheels provided upon the chain, and means for effecting the travel of the chain and the conveyed articles along said rail-supports.

4. In apparatus of the class described, the combination with parallel rail-supports, of endless chains travelling above and below said rail-supports, means for effecting the relative adjustment of said rail-supports toward and from each other, a plurality of supporting wheels for the endless chains mounted upon the rail-supports and adjustable therewith, means for effecting the travel of said chains, and terminal means for insuring the alinement of the wheels with the rail-supports.

5. In apparatus of the class described, the combination with parallel rail-supports, of endless chains travelling above and below said rail-supports, means for effecting the relative adjustment of said rail-supports toward and from each other, a plurality of supporting wheels for the endless chains mounted upon the rail-supports and adjustable therewith, means for effecting the travel of said chains, and flexible alining members terminally positioned to track the wheels upon the supporting rails in their relatively adjusted positions.

6. In conveyor apparatus of the class described, the combination with parallel rail-supports, of means for effecting their relative adjustment toward and from each other, a lower set of rail-supports, an endless conveyor chain travelling upon said rail-supports, a plurality of rolls therefor mounted upon the rail supports and adjustable with those first named toward and from each other, means for effecting the travel of said chain, and flexible alining members terminally positioned with respect to the two levers of rail-supports adapted to track the rolls upon the rails conformable to their adjusted positions.

7. In conveyor apparatus, the combination with parallel supporting rails, of means for effecting their relative adjustment toward and from each other, a conveyor chain operatively associated therewith, including rolls disposed at intervals upon said chain and bearing upon the rail-supports; said rolls being adjustable with the rail-supports toward and from each other, and means for effecting the travel of the conveyor chain longitudinally of the rail-supports.

8. In conveyor apparatus of the class described, the combination with parallel L-sectioned rails, of means for effecting the relative adjustment of said rails toward and from each other and for locking them in their adjusted positions, a conveyor chain running longitudinally of said rails, grooved supporting rolls engaging over said rails and adjustable therewith, and means also provided at intervals upon the conveyor chain adapted to advance articles in rolling engagement with said rails.

In testimony whereof I do now affix my signature.

CHARLES T. DRAPER.